United States Patent [19]

Nekovar et al.

[11] Patent Number: 5,559,850
[45] Date of Patent: Sep. 24, 1996

[54] X-RAY DIAGNOSTICS INSTALLATION

[75] Inventors: Anton Nekovar, Neunkirchen; Andreas Meyer, Bubenreuth, both of Germany

[73] Assignee: Siemens Aktiengesellschaft, Munich, Germany

[21] Appl. No.: 541,118

[22] Filed: Oct. 11, 1995

Related U.S. Application Data

[63] Continuation of Ser. No. 289,210, Aug. 12, 1994, abandoned.

[30] Foreign Application Priority Data

Sep. 10, 1993 [DE] Germany .......................... 43 30 784.1

[51] Int. Cl.⁶ ......................................... H05G 1/64
[52] U.S. Cl. ........................... 378/98.8; 378/98.2
[58] Field of Search ..................... 378/98.8, 98.2

[56] References Cited

U.S. PATENT DOCUMENTS 4,901,336  2/1990  Nishiki .
5,101,421  3/1992  Nishiki ................................. 378/98.8

FOREIGN PATENT DOCUMENTS 4137724  5/1992  Germany .

*Primary Examiner*—Craig E. Church

[57] ABSTRACT

An x-ray diagnostics installation has an x-ray generator, an x-ray tube and an x-ray image intensifier to which a video camera with a CCD image sensor is coupled. The video camera includes a control generator that is connected to a control output of the x-ray generator and to the CCD image sensor, and controls the latter such that the read-out clock is interrupted synchronously with the video clock on the basis of a signal supplied by the x-ray generator.

5 Claims, 2 Drawing Sheets

X-RAY DIAGNOSTICS INSTALLATION

This is a continuation of application Ser. No. 08/289,210, filed Aug. 12, 1994 abandoned.

BACKGROUND OF THE INVENTION

1. Field of the Invention

The invention is directed to an x-ray diagnostics installation of the type having an x-ray generator, an x-ray tube and an x-image intensifier to which a video camera with CCD image sensor is coupled. Such x-ray diagnostics installations serve the purpose of reproducing x-ray images on a monitor.

2. Description of the Prior Art

German OS 38 42 649 discloses an x-ray diagnostics installation of this general type wherein a CCD converter converts an image visible on the output luminescent screen of an x-ray image intensifier into an electrical signal that is digitized in an analog-to-digital converter (A/D converter) and is supplied to an image processor. A central system control device generates all clock and control signals for the overall x-ray diagnostics installation. The central system control device effects the activation the x-ray generator synchronized with the vertical pulses of the video clock, and effects a simultaneous interrupt of the read-out clock of the CCD image sensor. The central system control device effects a shut-off of the x-ray generator as well as the immediate enabling of the CCD image sensor on the basis of a measured signal. A disadvantage of this known cental control is that the control must be precisely synchronized with the video clock, so that a complicated, central system control device is required.

SUMMARY OF THE INVENTION

An object of the present invention is to provide an x-ray diagnostics installation of the type initially cited which enables a long-term exposure given a simple structure.

This object is inventively achieved in an x-ray diagnostics installation wherein the video camera includes a control generator that is connected to a control output of the x-ray generator, and is connected to an input of the CCD image sensor, and controls the latter such that the read-out clock is interrupted due to a signal supplied by the x-ray generator. An asynchronous control of the CCD image sensor that is independent of the x-radiation can ensue in a simple way on the basis of this control generator arranged in the video camera.

It has proven advantageous when the control generator generates a control signal that is synchronized with the video clock. An uninterrupted image playback can ensue when the control generator is connected to an image memory and switches the latter into the read mode given a clock interrupt. The integration mode can be selected when the control generator is connected to an operating mode switch. A simple structure of the control generator is achieved with the x-ray generator supplying a signal to the control generator that identifies the activation of x-radiation.

It has proven advantageous when the x-ray generator and an operating mode switch are connected such to the control generator which, given a specific, selected operating mode and with the x-radiation activated, causes the read-out clock for the CCD image sensor to be interrupted over a plurality of video frames synchronously with the video clock of the central unit and, after shut-off of the x-radiation, the read-out is begun again synchronously with the video clock, whereby an image memory is switched into the read mode during the interrupt.

DESCRIPTION OF THE PREFERRED EMBODIMENTS

Figure 1:
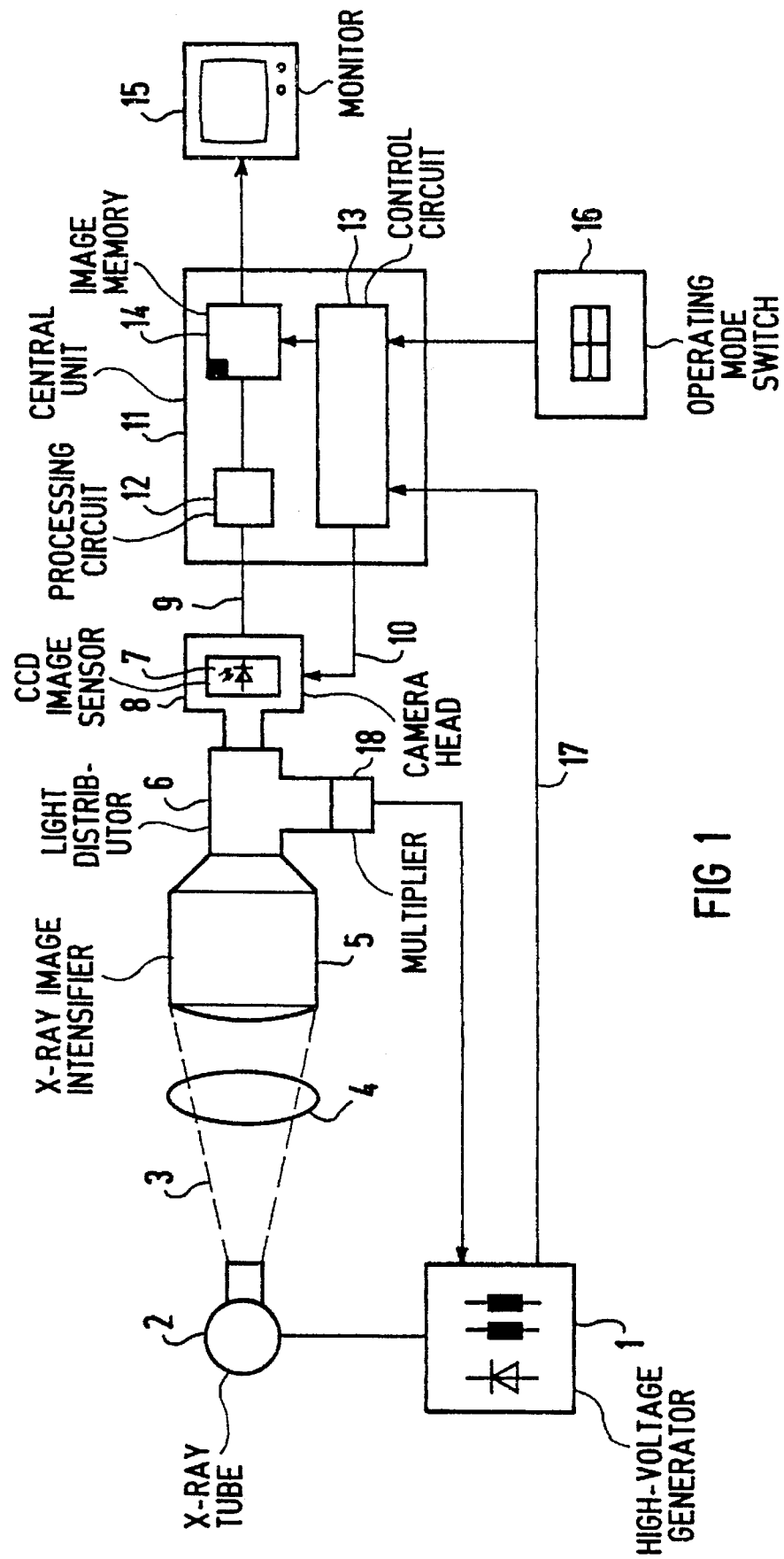
FIG. 1 is a schematic block diagram of an x-ray diagnostics installation of the invention.

FIG. 1 shows an x-ray diagnostics installation that includes an x-ray tube 2 operated by a a high-voltage generator 1, the x-ray tube 2 emitting an x-ray beam 3 that penetrates a patient 4. The x-ray image attenuated by the patient 4 in accord with the transparency of said patient 4 is incident on the input luminescent screen of an x-ray image intensifier 5, which converts the x-ray image into a visible x-ray picture. The visible x-ray picture which has arisen on the output luminescent screen of the x-ray image intensifier 5 is imaged via a light distributor 6 on a CCD image sensor 7 that is arranged in a camera head 8 of a video pick-up means. A central unit 11 of the video pick-up means is connected to the camera head 10 via a signal line 9 and via a clock line 10. The central unit 11 includes a processing circuit 12 that can contains a circuit for analog editing and can contain converters (transducers), a control circuit 13 (described below) and an image memory 14. The image memory 14 is connected to a monitor 15 for the playback of the x-ray picture.

An operating mode switch 16 with which various operating modes, including a long-term integration modes can be selected is connected to the control circuit 13 of the central unit 11. The x-ray generator 1 is also connected to the control circuit 13 via a control line 17 that supplies a signal to the control circuit 13 that identifies when the generation of x-radiation is activated.

Figure 2:
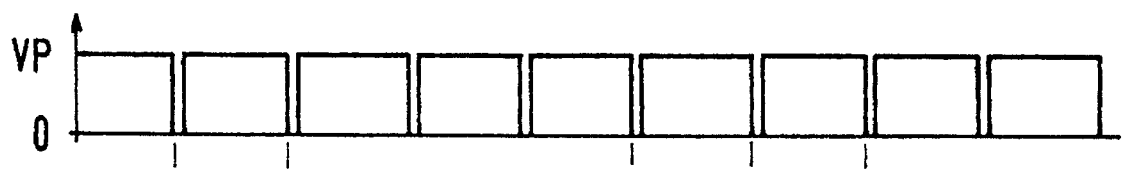
FIGS. 2–6 show respective curves for explaining the operation of the inventive installation of FIG. 1.
Figure 3:
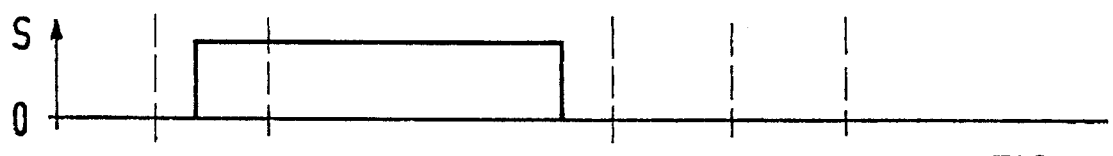

The x-ray diagnostics installation of the invention shall now be set forth in greater detail with reference to the curves shown in FIGS. 2–6. FIG. 2 shows the vertical pulses VP of the standard video clock that, for example, have a frequency of 50 or 60 Hz. The signal S on the control line 17 is shown in FIG. 3, this signal S signifying the activated condition of the x-ray system. This, however, means that the x-ray tube 2 is asynchronously activated relative to the vertical pulses VP during the first complete video clock shown in FIG. 2. When the operating mode switch 16 has been simultaneously switched to the integration mode, this signal S supplied to the control circuit 13 causes control signal St (shown in FIG. 4) to be sent via the clock line 10 to the CCD image sensor 7 with the next vertical pulse VP. The same procedure is repeated in a corresponding way if the x-ray tube 2 is shut off during a clock pulse, i.e., asynchronously relative to a vertical pulse VP. When this happens, the control signal of the control circuit 13 supplied to the CCD image sensor 7 via the clock line 10 is disconnected synchronously with the vertical pulses VP.

Figure 4:
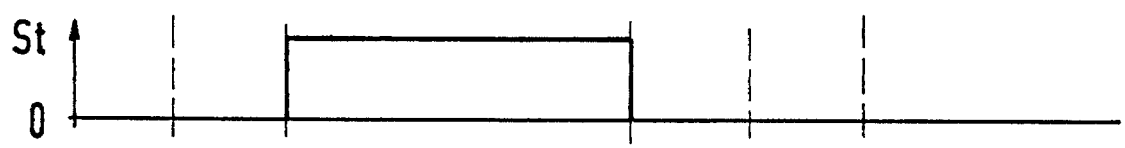
Figure 5:
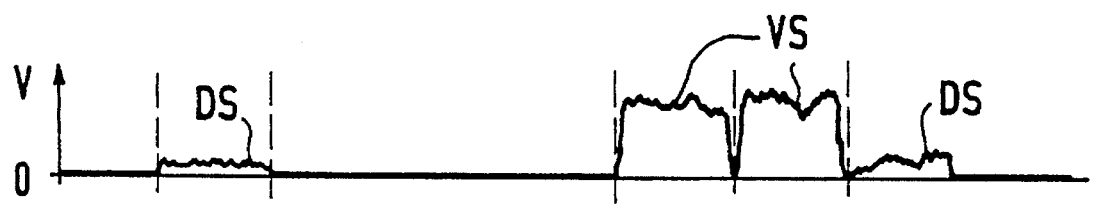
Figure 6:
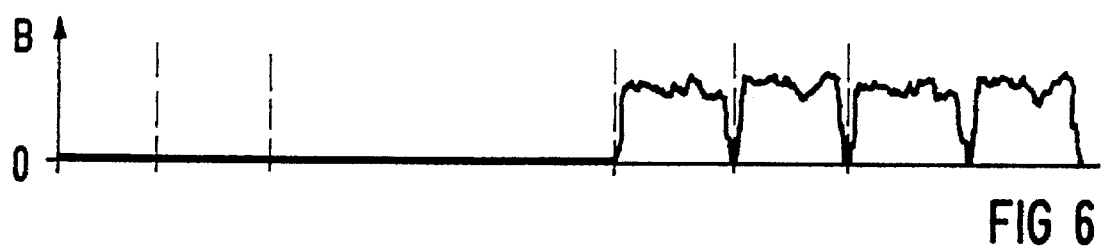

The control signal St that is shown in FIG. 4, and which is made available to the CCD image sensor 7 via the clock line 10, results in no read-out of the CCD image sensor 7 taking place during the signal. This event is shown in FIG. 5. Before the x-radiation is activated, the CCD image sensor 7 is continuously read out so that no residual charges can be contained therein. This can be seen by the low level of the curve of the dark current signal DS during the first video clock and pulse, that reflects the current of the CCD image sensor 7 without exposure. No read-out ensues for the following three clocks, so that the visible x-ray picture incident on the CCD image sensor 7 is integrated over this time. The read-out that leads to a clear video signal VS shown in FIG. 5 for two fields begins again only after the end of the x-radiation and synchronously with the next vertical pulse VP. Only the samplings following thereupon in turn yield a dark current signal DS. The output signal of the central unit 11 is shown in FIG. 6. Up to the first read-out, either the output is switched dark or a preceding x-ray picture contained in the image memory 14 is read out. The video signal is read into the image memory 14 together with the read-out of the CCD image sensor 7 and is simultaneously forwarded to the monitor 15. When both fields have been read out after two video clocks, then the control circuit 13 switches the image memory 14 to read mode, so that a video signal continues to be supplied to the monitor 15.

A multiplier 18 that is connected to the x-ray generator 1 and supplies it with a signal corresponding to the brightness in, for example, a dominant is connected to the light distributor 6 for regulating the high-voltage generator 1.

The x-radiation can be activated and de-activated completely asynchronously relative to the video clock by this inventive control circuit 13 in the central unit 11 of an x-ray diagnostics installation. By contrast to x-ray diagnostics installations having video pick-up tubes, the control need no longer ensue via a central location, thereby assuring that the imaging read out ensues at the time of the complete radiation block.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostics installation comprising:

a high-voltage supply coupled with an x-ray tube, for emitting an x-ray beam directed at a subject;

an x-ray image intensifier having an input screen on which an x-ray image, corresponding to x-rays from said x-ray tube attenuated by said subject, is present, and having an output screen at which an optical image corresponding to said x-ray image is present;

a video camera having a CCD image sensor coupled to said output screen of said x-ray image intensifier, said CCD image sensor having a control input supplied with a read-out clock signal for causing read-out of said CCD image sensor;

means for activating said x-ray tube to emit said x-ray beam and for generating an activation signal as long as said x-ray tube is activated; and said video camera including control means, connected to said control input of said CCD image sensor and connected to receive said activation signal indicating when said x-ray generator is activated, for generating a sensor control signal for interrupting said read-out clock after a beginning of said activation signal and starting said read-out clock after an ending of said activation signal, for asynchronously controlling said read-out clock relative to activation of said x-ray tube.

2. An x-ray diagnostics installation as claimed in claim 1 wherein said control means of said video camera comprises means for generating a control signal supplied to said control input which is synchronous with a video clock signal.

3. An x-ray diagnostics installation as claimed in claim 1 further comprising an image memory connected to said CCD image sensor, and wherein said control means of said video camera comprises means for switching said image memory into a read mode during the interruption of said read-out clock.

4. An x-ray diagnostics installation as claimed in claim 1 further comprising an operating mode switch connected to said control means of said video camera for selecting an operating mode of said video camera.

5. An x-ray diagnostics installation as claimed in claim 4 wherein, during a selected operating mode selected by said operating mode switch and during activation of said x-ray tube, said control means of said video camera comprises means for interrupting said read-out clock of said CCD image sensor for a plurality of video frames of a video clock signal and, after deactivation of said x-ray tube, for again beginning read-out of said CCD image sensor synchronized with said video clock, and further comprising an image memory and means for switching said image memory into a read mode during the interruption of said read-out clock.

* * * * *